United States Patent
Morrow

(10) Patent No.: US 7,409,484 B2
(45) Date of Patent: Aug. 5, 2008

(54) INTEGRATED CIRCUIT HAVING REDUCED PIN COUNT

(75) Inventor: Neil Morrow, San Jose, CA (US)

(73) Assignee: O2Micro International Limited, Georgetown, Grand Cayman (KY)

( * ) Notice: Subject to any disclaimer, the term of this patent is extended or adjusted under 35 U.S.C. 154(b) by 0 days.

(21) Appl. No.: 11/068,245

(22) Filed: Feb. 28, 2005

(65) Prior Publication Data
US 2005/0149652 A1 Jul. 7, 2005

Related U.S. Application Data

(63) Continuation-in-part of application No. 10/463,494, filed on Jun. 17, 2003.

(60) Provisional application No. 60/446,590, filed on Feb. 11, 2003.

(51) Int. Cl.
*G06F 13/00* (2006.01)

(52) U.S. Cl. .................. 710/301; 710/19

(58) Field of Classification Search ............ 710/8, 710/15–19, 51, 62–64, 300–302, 313; 703/25
See application file for complete search history.

(56) References Cited

U.S. PATENT DOCUMENTS

| | | | | |
|---|---|---|---|---|
| 5,812,827 A | * | 9/1998 | McGrath | 703/25 |
| 5,905,885 A | * | 5/1999 | Richter et al. | 710/5 |
| 5,920,731 A | * | 7/1999 | Pletl et al. | 710/14 |
| 6,470,284 B1 | * | 10/2002 | Oh et al. | 702/64 |
| 6,845,249 B1 | * | 1/2005 | Miller et al. | 455/556.1 |

OTHER PUBLICATIONS

PC Card Controllers, pp. 16, 26, 35, and 85, Texas Instruments, Oct. 1998.*
PCMCIA Frequently Asked Questions, www.pcmcia.org.*
Definition of PC Card by Wikipedia.*
English translation of Preliminary Notice of Reasons for Rejection dated Jul. 24, 2006 received in corresponding Taiwan Patent Application No. 094147254 (4 pages).
Translation of Taiwan Preliminary Notice of Rejection of the IPO dated Oct. 12, 2006 received in corresponding Taiwan Patent Application Serial No. 094147254 (4 pages).

* cited by examiner

*Primary Examiner*—Khanh Dang
(74) *Attorney, Agent, or Firm*—Grossman, Tucker, Perreault & Pfleger, PLLC

(57) ABSTRACT

A method according to one embodiment may include decoupling a CAUDIO/SPKR#/BVD2 signal line from a PC Card controller integrated circuit. The method of this embodiment may also include controlling, by the PC Card controller integrated circuit, at least one PC Card independently of the CAUDIO/SPKR#/BVD2 signal line. Of course, many alternatives, variations, and modifications are possible without departing from this embodiment.

17 Claims, 3 Drawing Sheets

INTEGRATED CIRCUIT HAVING REDUCED PIN COUNT

CROSS-REFERENCE TO RELATED APPLICATION

The subject application is a continuation-in-part of co-pending U.S. patent application Ser. No. 10/463,494, entitled "Reduced CardBus Controller" filed on Jun. 17, 2003, which itself claims priority to Provisional Application Ser. No. 60/446,590, filed Feb. 11, 2003, both of which are hereby incorporated by reference in their entirety.

FIELD

The present disclosure relates to an integrated circuit having reduced pin count.

BACKGROUND

Conventional PC Card controllers have a terminal called CAUDIO/SPKR#/BVD2 used as an audio input from the PC Card in some modes, and a battery voltage detection input in other modes. Conventional controllers also have a terminal, typically called SPKROUT# or SPKR_OUT#, that outputs audio data associated with CAUDIO/SPKR#/BVD2 either directly to a speaker interface chip, a CODEC, or some other logic that may use this audio information.

Other conventional controllers provide dual-socket PC Card controllers. In these controllers each socket includes a CAUDIO/SPKR#/BVD2 terminal, and typically logic in the PC Card controller combines audio data from these two inputs into one audio output, called SPKROUT#.

In some PC Card configurations, the CAUDIO/SPKR#/BVD2 terminal provides indication of a battery condition. Conventional PC Card controllers include legacy Intel 82365 ExCA (Exchangeable Card Architecture) programming registers, and these registers report battery conditions to software. There are two battery voltage detection pins defined by the PC Card Standard: CAUDIO/SPKR#/BVD2 and CSTSCHG/STSCHG#/BVD1.

These conventional controllers do not offer reduced pin count, which may make them in more cost effective packages, and/or packages with smaller geometries.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
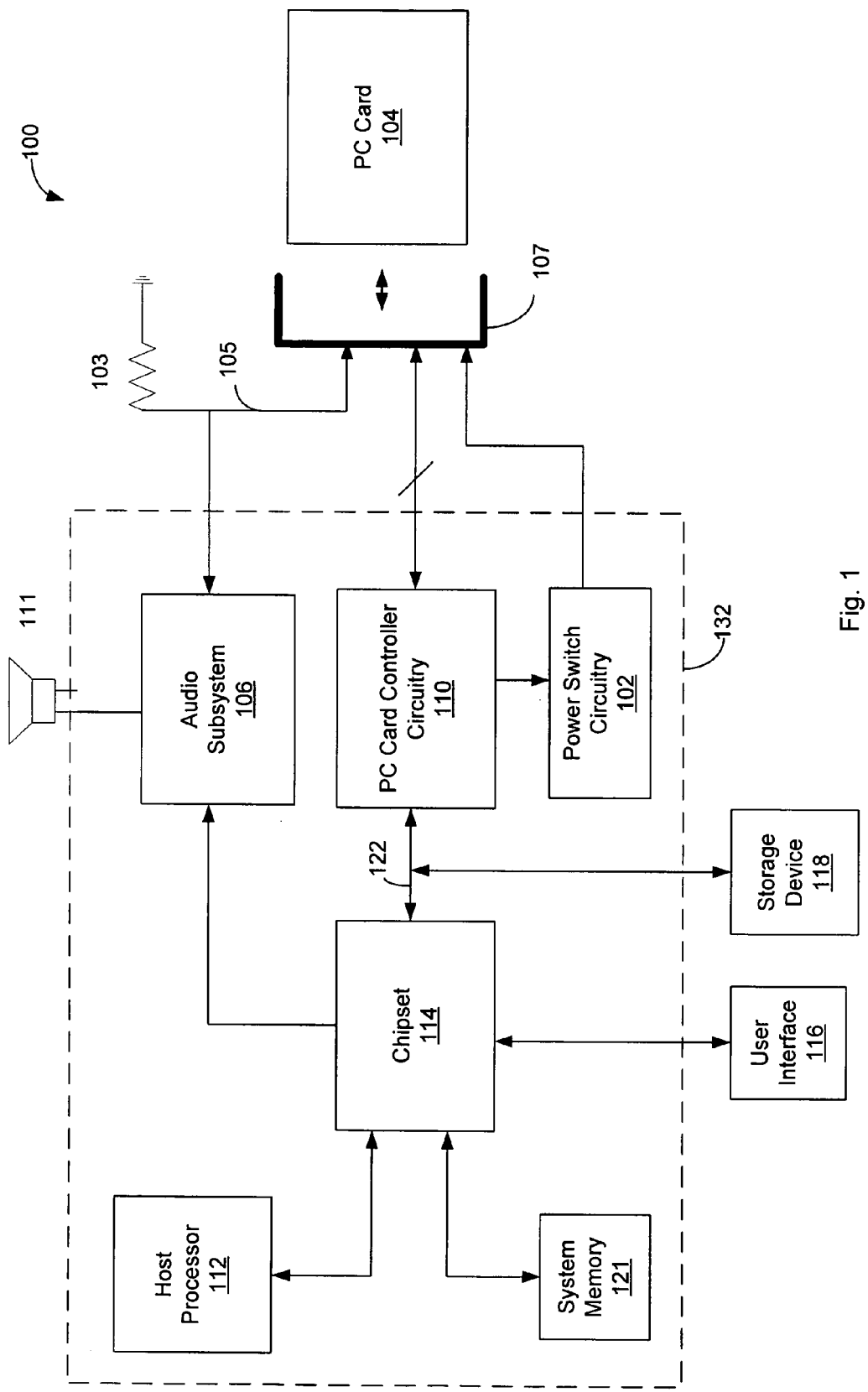
FIG. 1 illustrates an exemplary system embodiment.

FIG. 1 illustrates a system embodiment 100 of the claimed subject matter. The system 100 may generally include a host processor 112, a bus 122, a user interface system 116, a chipset 114, system memory 121, PC Card controller circuitry 110, audio subsystem circuitry 106 and power switch circuitry 102. As used in any embodiment herein, "circuitry" may comprise, for example, singly or in any combination, hardwired circuitry, programmable circuitry, state machine circuitry, and/or firmware that stores instructions executed by programmable circuitry. Also, in any embodiment herein, circuitry 110 and/or 102 may be embodied as, and/or form part of, one or more integrated circuits. As used herein, an "integrated circuit" means a semiconductor device and/or microelectronic device, such as, for example, a semiconductor integrated circuit chip. Embodied as an integrated circuit, circuitry 110 may comprise a plurality of input/output pins which may operate to couple circuitry 110 to one or more components of system 100 and/or external components.

This embodiment may also include a storage device 118. Storage device 118 may include, for example, a magnetic, optical and/or semiconductor media, for example, a hard disk device. The host processor 112 may include any variety of processors known in the art such as an Intel® Pentium® IV processor. The bus 122 may include various bus types to transfer data and commands. For instance, bus 122 may comply with the Peripheral Component Interconnect (PCI) Express™ Base Specification Revision 1.0, published Jul. 22, 2002, available from the PCI Special Interest Group, Portland, Oreg., U.S.A. (hereinafter referred to as a "PCI Express™ bus"). The bus 122 may alternatively or additionally comply with a Serial Peripheral Interface (SPI) Specification (hereinafter referred to as an "SPI bus") or a 32-bit parallel bus compatible with the PCI Local Bus Specification Version 2.2. Processor 112, system memory 121, chipset 114, bus 122, PC Card controller circuitry 110, audio subsystem circuitry 106 and power switch circuitry 102 may be comprised in a single circuit board, for example, motherboard 132, and these components collectively or individually may form a host system.

The user interface 116 may include a variety of devices for human users to input commands and/or data and to monitor the system such as a keyboard, pointing device, and video display. The chipset 114 may include host bridge/hub system (not shown) that couples the processor 112, system memory 121, user interface system 116, storage device 118, and PC Card controller circuitry 110, audio subsystem circuitry 106 and power switch circuitry 102 to each other and to the bus 122. Chipset 114 may include integrated circuit chips, such as those selected from integrated circuit chipsets commercially available (e.g., graphics memory and I/O controller hub chipsets), although other integrated circuit chips may also, or alternatively be used.

System memory 121 may comprise one or more of the following types of memories: semiconductor firmware memory, programmable memory, non-volatile memory, read only memory, electrically programmable memory, random access memory, flash memory (which may include, for example, NAND or NOR type memory structures), magnetic disk memory, and/or optical disk memory. Either additionally or alternatively, memory 121 may comprise other and/or later-developed types of computer-readable memory. Machine-readable firmware program instructions may be stored in memory 121, and may comprise, for example, software. Such software may be accessed and executed by host processor 112 and/or PC Card controller circuitry 110. When executed by host processor 112 and/or PC Card controller circuitry 110, these instructions may result in host processor 112 and/or PC Card controller circuitry 110 performing the operations described herein as being performed by host processor 112 and/or PC Card controller circuitry 110.

Audio subsystem 106 which may comprise, for example speaker interface circuitry capable of driving a speaker 111, coder/decoder circuitry (CODEC) capable of coding and decoding audio data, and/or other circuitry capable of manipulating audio data. The system 100 of FIG. 1 may also include a PC Card socket 107 which may be capable of electrically and mechanically coupling one or more PC Cards 104 thereto. PC Card 104 may include, for example, one or more cards that comply or are compatible with a PC Card specification, a CardBus specification and/or PCMCIA specification, and the type of card may include, for example, an input/output (I/O) card and/or memory card. PC Card controller circuitry 110 may be capable of controlling I/O transactions to and/or from card 104 in a manner consistent with the type of card present in the system 100. Thus, for example, if card 104 is a PCMCIA I/O card, then controller 110 may be capable of controlling that card type. Controller 110 may also be capable of coupling power to card 104, via power switch circuitry 102.

Figure 2:
FIG. 2 illustrates the ExCA Interface Status Register.

FIG. 2 illustrates the ExCA ("Extendable Card Architecture") Interface Status Register 200. The ExCA registers may be used by PC Card controllers that comply or are compatible with PC Card signal specifications (which may include, for example, PC Card, CardBus, and/or PCMCIA compatible cards). The status register 200 specifies bits (e.g., bits 0-7) that may be manipulated by a controller to convey certain information. For example, bits 1 and 0 (1:0) may be associated with battery voltage detect pins of the controller (BVD1 and BVD2) and the setting of these bits may operate to communicate battery condition status the PC Card controller and/ or to one or more applications (e.g., software) being executed on a host processing system.

Referring again to the exemplary system embodiment 100 of FIG. 1, the PC Card controller circuitry 110 may have a reduced pin count by removing the CAUDIO/SPKR#/BVD2 pin and the SPKR_OUT# pin. Also, in this embodiment, PC Card controller circuitry 110 may remain compatible with one or more PC Cards that may use these signal signals associated with the removed pins, for example, a PCMCIA memory cards that may include batteries, and/or the BVD2 signal in certain configurations.

If card 104 is a CardBus card, signal line 105 may be coupled to the CAUDIO signal line, via socket 107. The CAUDIO signal may communicate audio information from the CardBus card. If card 104 is a 16 bit PCMCIA I/O card, signal line 105 may be coupled to the SPKR# signal line, via socket 107. The SPKR# signal may communicate audio information from the PCMCIA card. If card 104 is a 16 bit PCMCIA memory card, signal line 105 may be coupled to the BVD2 signal line, via socket 107. A 16 bit PCMCIA memory card may comprise a battery, and the BVD2 signal may communicate battery voltage information from the PCMCIA card.

In this embodiment, depending on the type of card 104 coupled to socket 107, the CAUDIO/SPKR#/BVD2 signal line 105 may be kept at a constant voltage level by an external resistor 103. Resistor 103 may comprise a pull-down resistor capable of pulling the CAUDIO/SPKR#/BVD2 signal line 105 to reference ground. Signal line 105 may be coupled to the audio subsystem 106, but not coupled to controller circuitry 110. In this manner, the CAUDIO/SPKR#/BVD2 pin and the SPKROUT# pin of controller circuitry 110 may be removed. Thus, the PC Card controller circuitry 110 may be capable of controlling the PC Card 104 independently of a CAUDIO/SPKR#/BVD2 signal line generated by said PC Card 104. The resistor 103 may keep the CAUDIO/SPKR#/BVD2 signal line 105 at the ground reference voltage when no card is inserted. In an alternate embodiment, a pull-up resistor could be used to keep the CAUDIO/SPKR#/BVD2 signal 105 at a valid logic level when no card is inserted.

In the PC Card controller circuitry 110 of this embodiment, the BVD2 status bit (which corresponds to bit 1 of the ExCA Interface Status Register 200 depicted in FIG. 2) may be hardwired to a value of '1'. This may cause controller 110 to generate signals indicative of the condition of a battery associated with a 16 bit PCMCIA memory card. This may operate to remove the battery condition of "warning", and provide "Battery Good" and "Battery Dead" conditions based on the value of BVD1. These signals may be used by software being executed on the host system. To maintain compatibility with legacy Intel 82365 ExCA programming methods, the PC Card controller circuitry 110 may force the BVD2 status reporting register at a fixed value that communicates a "BATTERY GOOD" condition.

Figure 3:
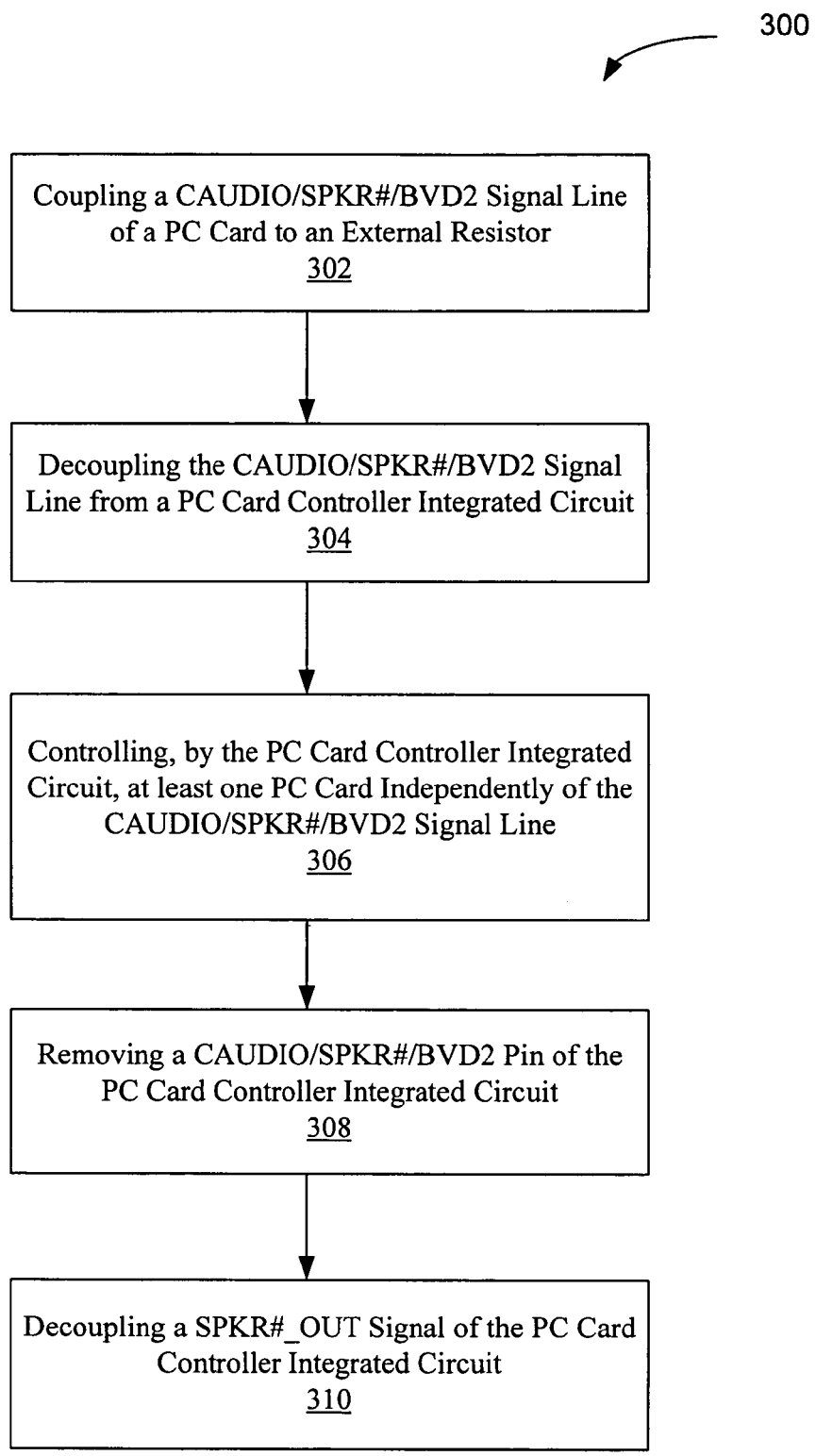
FIG. 3 is a flowchart illustrating exemplary operations according to one embodiment.

FIG. 3 is a flowchart of exemplary operations which may be performed according to one embodiment. Operations may include coupling a CAUDIO/SPKR#/BVD2 signal line of a PC card to an external resistor 302. Operations may further include decoupling the CAUDIO/SPKR#/BVD2 signal line from a PC Card controller integrated circuit 304. Operations may additionally include controlling, by the PC Card controller integrated circuit, at least one PC Card independently of the CAUDIO/SPKR#/BVD2 signal line 306. In at least one embodiment, operations may further include removing a CAUDIO/SPKR#/BVD2 pin of the PC Card controller integrated circuit 308. Operations may further include decoupling a SPKR#_OUT signal of the PC Card controller integrated circuit 310, which may permit removal of the SPKR#_OUT pin of the PC Card controller integrated circuit.

In another embodiment, and with continued reference to the system 100 of FIG. 1, software which may be executed on host processor 112 and/or PC Card controller circuitry 110 may be capable of ignoring bit 1 of the ExCA Interface Status Register (corresponding to the BVD2 signal line), and instead use a value of '1' for associated with the BVD2 signal. In this embodiment, the external resistor 103 of FIG. 1 may be omitted, and similar to the previous embodiment, the CAUDIO/SPKR#/BVD2 and SPKR#_OUT pins of the PC Card controller circuitry 110 may be removed.

In yet another embodiment, FIG. 1 may alternatively or additionally include another socket similar to socket 107 which may be capable of receiving another PC card (similar to card 104). A second PC Card controller circuitry may be provided to control the operation of the second card. In such an embodiment, each CAUDIO/SPKR#/BVD2 pin and SPKR#_OUT pins of the PC Card controller circuitry may be removed, in a manner described above with reference to FIGS. 1-3.

Thus, in summary, at least one embodiment herein may provide an integrated circuit capable of controlling the operation of at least one PC Card. The integrated circuit of this embodiment may be further capable of controlling the PC Card independently of a CAUDIO/SPKR#/BVD2 signal line generated by the PC Card.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An apparatus, comprising:
a PCMCIA compliant integrated circuit configured to control an operation of a PCMCIA compliant PC Card wherein said PCMCIA compliant integrated circuit is not coupled to a CAUDIO/SPKR#/BVD2 signal line and wherein said CAUDIO/SPKR#/BVD2 signal line is configured to be maintained at a substantially constant voltage level by an external resistor, said PCMCIA compliant integrated circuit comprising a status register including a CAUDIO/SPKR#/BVD2 status bit set to a predetermined, fixed value.

2. The apparatus of claim 1, wherein:
said PC Card comprises a 16 bit PCMCIA memory card comprising a battery, and said PCMCIA compliant integrated circuit is further configured to fix said value of said CAUDIO/SPKR#/BVD2 status bit to generate signals indicative of the condition of said battery.

3. The apparatus of claim 1, wherein:
said PCMCIA compliant PC Card is selected from the group consisting of a 16 bit PCMCIA input/output card and a 16 bit PCMCIA memory.

4. The apparatus of claim 1, wherein:
said PCMCIA compliant integrated circuit complies with an ExCA ("Extendable Card Architecture") Interface Status Register, said PCMCIA compliant integrated circuit is further configured to set a bit in a Status Register associated with a BVD2 signal to said pre-determined, fixed value.

5. A method, comprising:
decoupling a CAUDIO/SPKR#/BVD2 signal line from a PCMCIA compliant PC Card controller integrated circuit;
setting a CAUDIO/SPKR#/BVD2 status bit in a Status Register associated with said PCMCIA compliant PC Card controller integrated circuit a BVD2 signal to a pre-determined value;
coupling said CAUDIO/SPKR#/BVD2 signal line to an external resistor to maintain said CAUDIO/SPKR#/BVD2 signal line at a substantially constant voltage level; and
controlling, by the PCMCIA compliant PC Card controller integrated circuit, a PCMCIA compliant PC Card wherein said PCMCIA compliant PC Card controller integrated circuit is not coupled to the CAUDIO/SPKR#/BVD2 signal line.

6. The method of claim 5, further comprising:
coupling said CAUDIO/SPKR#/BVD2 signal line of said PC card to a resistor external to said PCMCIA compliant PC Card controller integrated circuit.

7. The method of claim 5, further comprising:
removing a CAUDIO/SPKR#/BVD2 pin of The PCMCIA compliant PC Card controller integrated circuit.

8. The method of claim 5, further comprising:
decoupling a SPKR#_OUT signal of the PCMCIA compliant PC Card controller integrated circuit; and
removing a SPKR#_OUT pin of the PCMCIA compliant PC Card controller integrated circuit.

9. The method of claim 5, wherein said PCMCIA compliant PC Card controller integrated circuit complies with an ExCA ("Extendable Card Architecture") Interface Status Register, said method further comprising:
setting said CAUDIO/SPKR#/BVD2 status bit in said Status Register to said pre-determined value.

10. The method of claim 5, wherein:
said PCMCIA compliant PC Card is selected from the group consisting of a 16 bit PCMCIA input/output card and a 16 bit PCMCIA memory.

11. An article comprising:
a storage medium storing instructions that when executed by a machine result in the following operations:
ignoring, by a PCMCIA compliant PC Card controller integrated circuit that complies with an ExCA ("Extendable Card Architecture") Interface Status Register, a BVD2 signal associated with said Status Register; and
fixing the value of a BVD2 status bit associated with said status Register to a predetermined, fixed selected value, wherein said BVD2 signal line is configured to be maintained at a substantially constant voltage level by an external resistor.

12. The article of claim 11, wherein said instructions that when executed by said machine result in the following additional operations:
operating at least one PC Card independently of a CAUDIO/SPKR#/BVD2 signal line generated by said PC Card.

13. The article of claim 11, wherein said instructions that when executed by said machine result in the following additional operations:
operating said PC Card controller integrated circuit independently of a SPKR#_OUT signal.

14. A system, comprising:
a host processor; and
a PCMCIA compliant PC Card controller integrated circuit configured to be connected to said host processor, said PCMCIA compliant PC Card controller integrated circuit is further configured to control the operation of a PCMCIA compliant PC Card wherein said PCMCIA compliant PC Card integrated circuit is not coupled to a CAUDIO/SPKR#/BVD2 signal line, wherein said CAUDIO/SPKR#/BVD2 signal line is configured to be maintained at a substantially constant voltage level by an external resistor and wherein said PCMCIA compliant PC Card integrated circuit comprises a status register including a CAUDIO/SPKR#/BVD2 status bit set to a predetermined, fixed value.

15. The system of claim 14, wherein:
said PC Card comprises a 16 bit PCMCIA memory card comprising a battery, and said PCMCIA compliant PC Card controller integrated circuit is further configured to fix said value of said CAUDIO/SPKR#/BVD2 status bit to generate signals indicative of the condition of said battery.

16. The system of claim 14, wherein:
said PCMCIA compliant PC Card is selected from the group consisting of a 16 bit PCMCIA input/output card and a 16 bit PCMCIA memory.

17. The system of claim 14, wherein:
said PCMCIA compliant PC Card integrated circuit complies with an ExCA ("Extendable Card Architecture") Interface Status Register, said PCMCIA compliant PC Card integrated circuit is further configured to set a bit in a Status Register associated wit a BVD2 signal to said pre-determined, fixed value.

* * * * *